Figure 1:
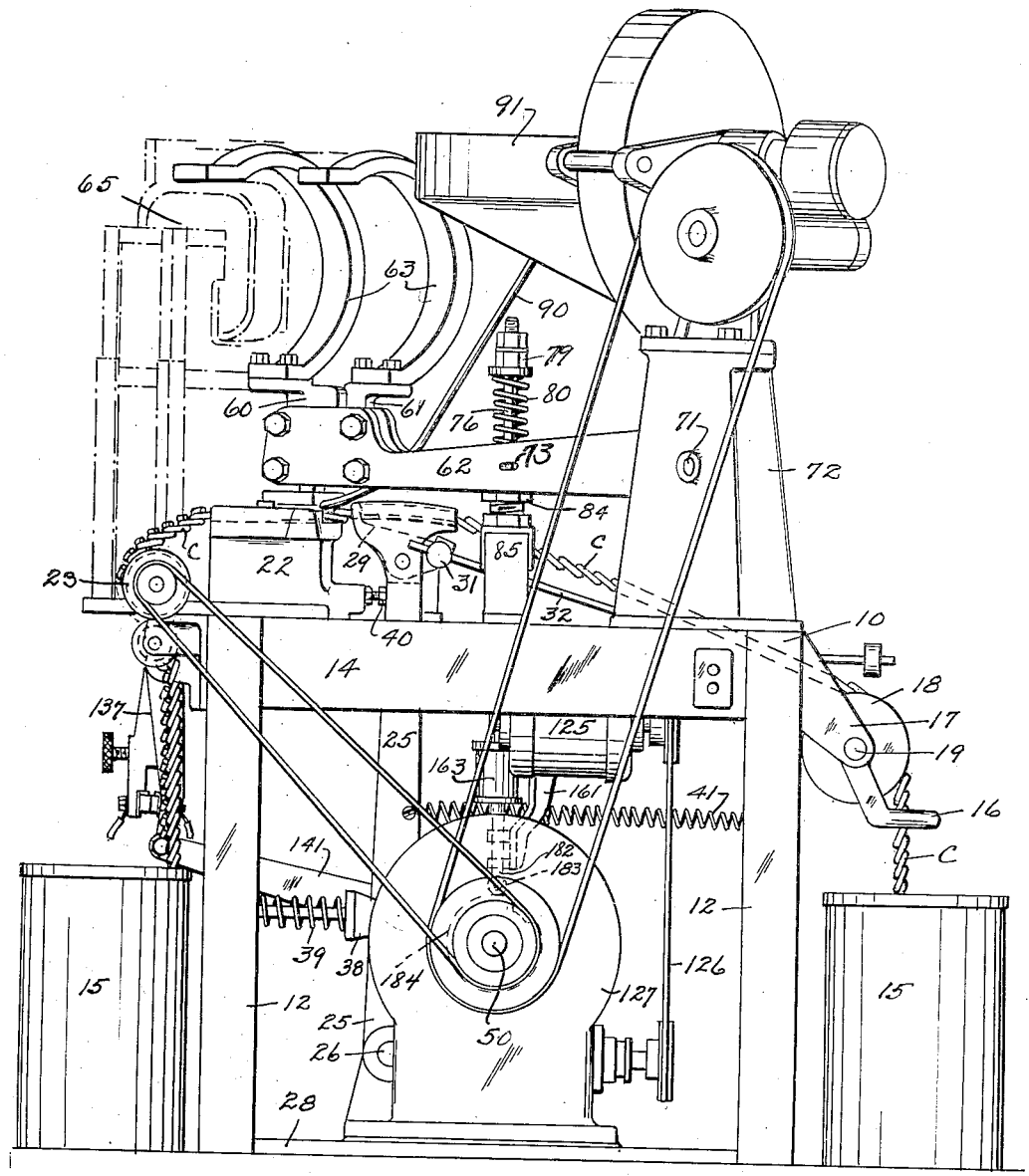

July 9, 1935. M. R. WELLS 2,007,587
SYSTEM OF ELECTRIC WELDING
Filed May 13, 1932 6 Sheets-Sheet 1

Inventor
Merritt R. Wells,
By Barns, Golrick & Tear,
Attorneys

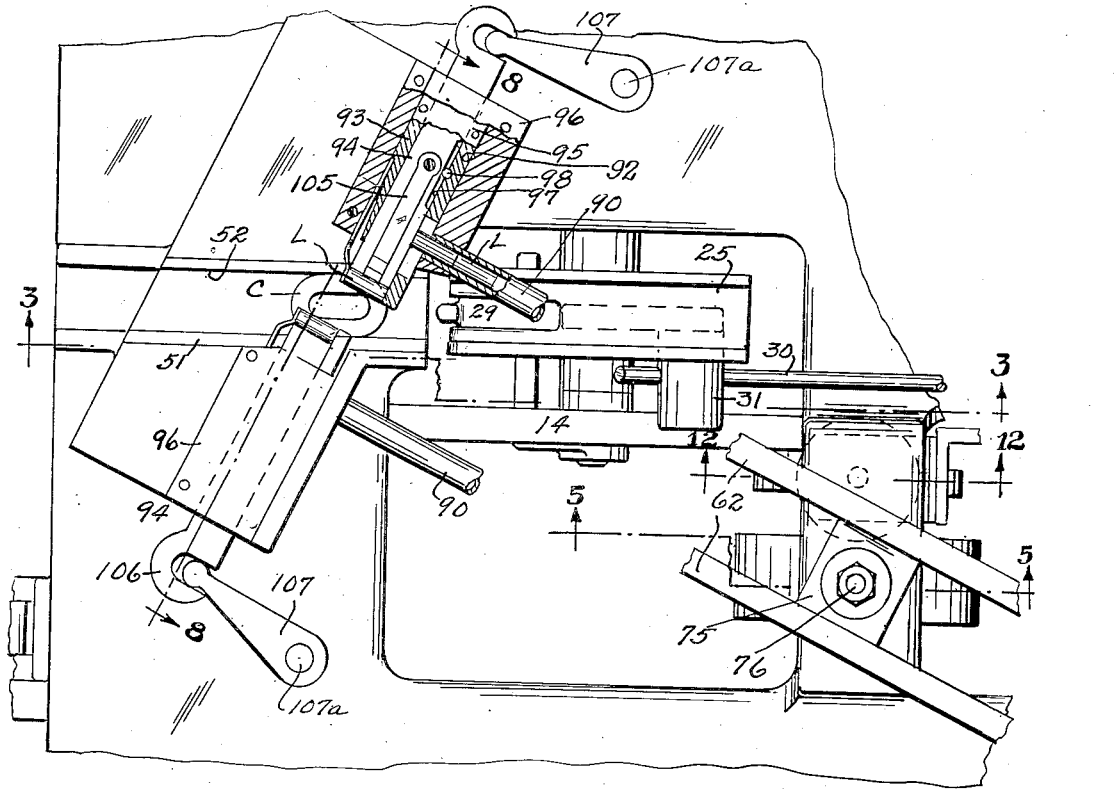

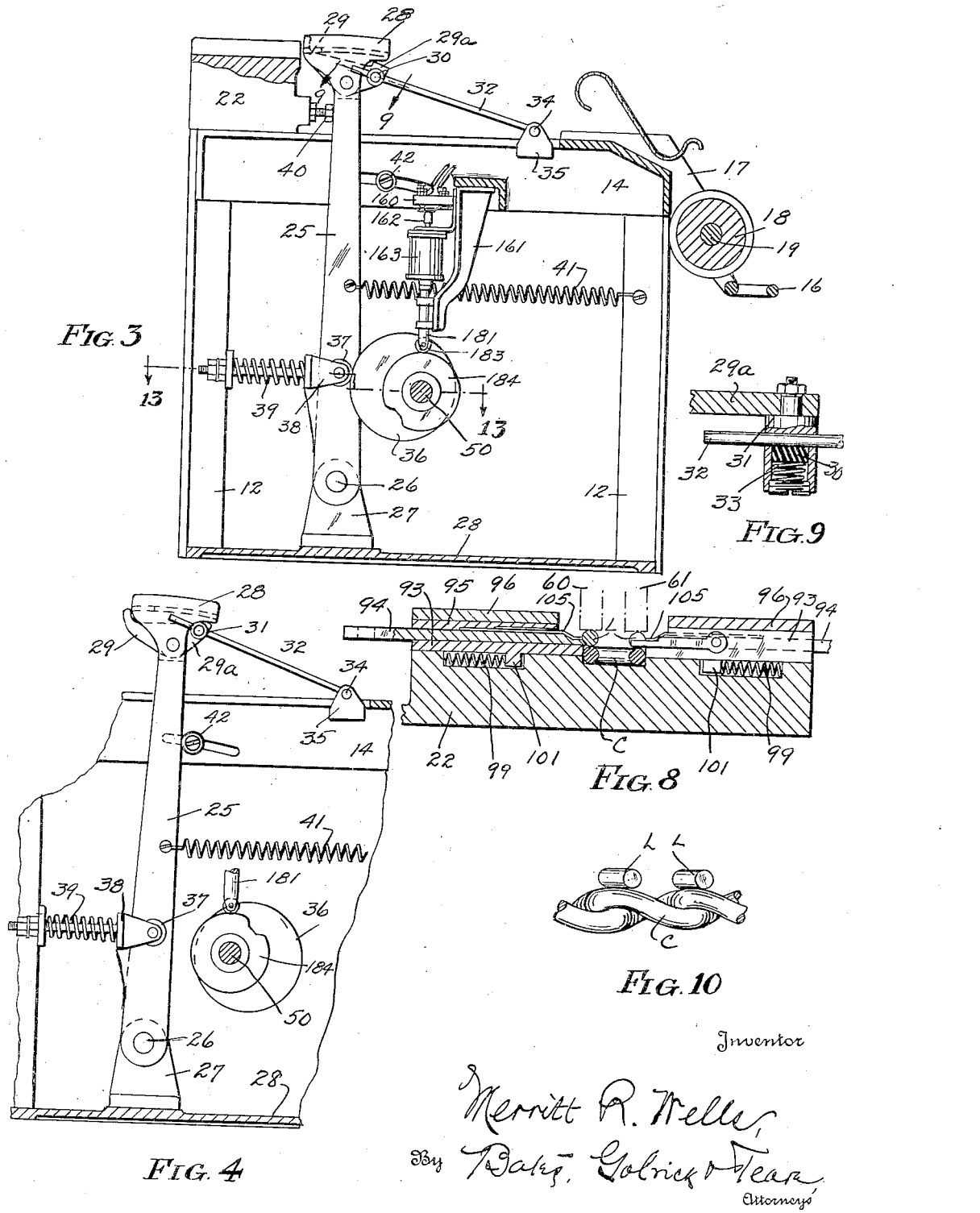

July 9, 1935.  M. R. WELLS  2,007,587
SYSTEM OF ELECTRIC WELDING
Filed May 13, 1932   6 Sheets-Sheet 4

Inventor
Merritt R. Wells
By Bair Golnick Hearn
Attorneys

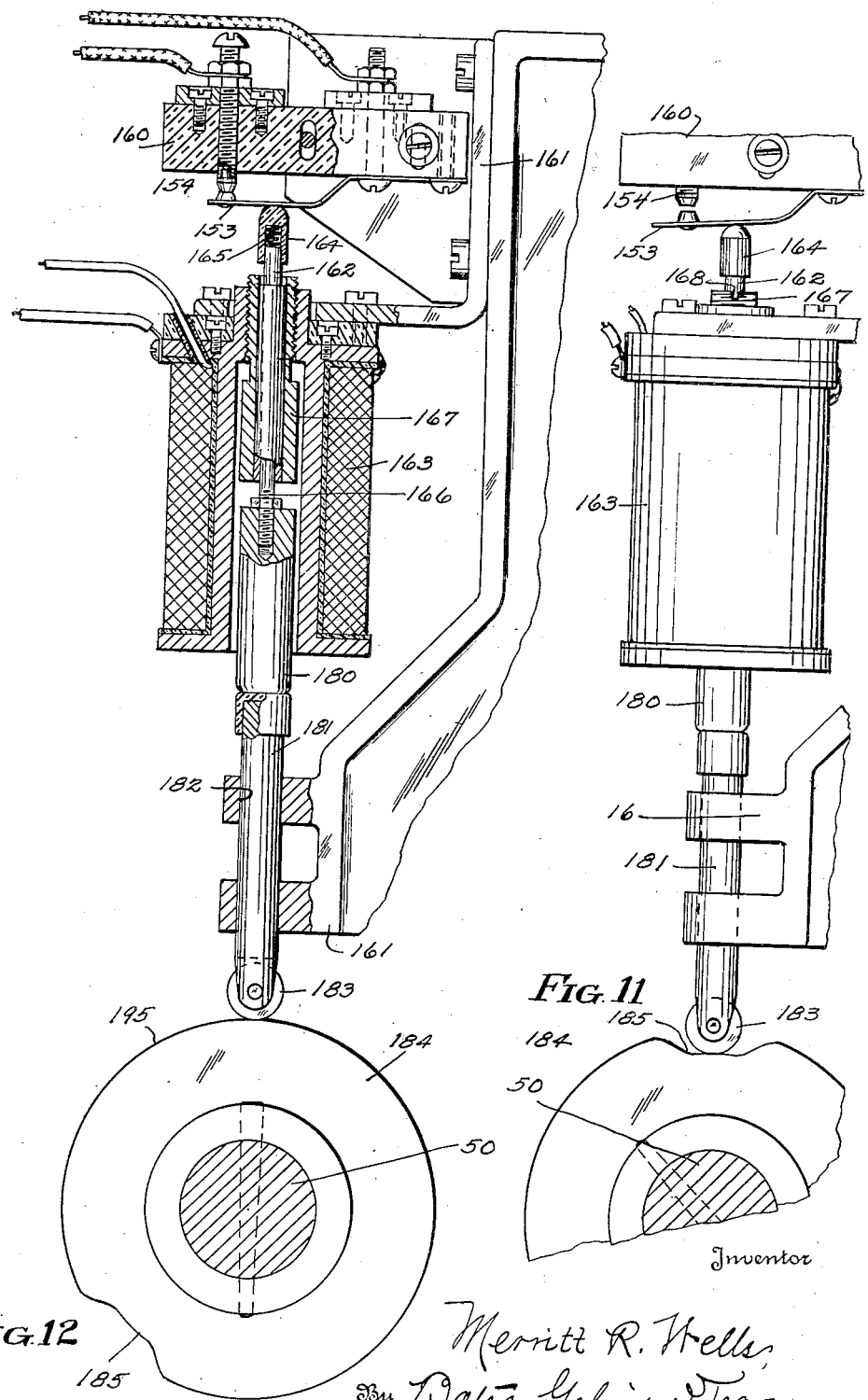

July 9, 1935.  M. R. WELLS  2,007,587
SYSTEM OF ELECTRIC WELDING
Filed May 13, 1932  6 Sheets-Sheet 6

Inventor
Merritt R. Wells,
By Oaks, Golrick & Hearn
Attorneys

Patented July 9, 1935

2,007,587

UNITED STATES PATENT OFFICE 2,007,587

SYSTEM OF ELECTRIC WELDING

Merritt R. Wells, Cleveland Heights, Ohio, assignor to The McKay Company, Pittsburgh, Pa., a corporation of Pennsylvania Application May 13, 1932, Serial No. 611,136

12 Claims. (Cl. 219—4)

This invention, which is for a method and apparatus of electric welding, is particularly concerned with provisions for preventing imperfect welds. These provisions may be employed in a welding operation acting automatically at predetermined times in repeating cycles of operation to enable the detection of imperfect welds and the curing of such imperfection before the next cycle takes place.

The invention includes a method and apparatus for detecting defective welds during the operation of an automatic welding mechanism, such as is shown in my Letters Patent on an Electric welding machine, 1,901,211, issued on March 14, 1933, which patent illustrates a mechanism arranged to weld lugs to certain links of a continuous chain. Such chain may be thereafter severed into short sections, some of the links of which have projecting lugs welded thereon, and fastening devices may be secured to the extreme links of the severed portions, as set out in my Letters Patent entitled "A method of making tire chains", 1,901,213, issued March 14, 1933.

I have illustrated my invention as used in connection with an automatic welding machine which is especially arranged to weld lugs or other metallic parts to links of a chain. However, my invention is readily adaptable for use on other automatic or semi-automatic electric welding machines, such, for instance, as a chain manufacturing machine which closes the links of a chain by welding. The use of my method of detecting imperfect electric welds is also advantageous where the welds are manually controlled.

The method of manufacturing a continuous chain by electric resistance welding is by no means new, and the welding of lugs to the links of a continuous chain is described and claimed in my patents heretofore mentioned, and there are numerous other instances in which a plurality of parts are successively welded to a metallic member or members, such as the welding of cross bars to reinforcing members for use in reinforced concrete, and the welding of comparatively fine work, such as the welding of cross wires to a pair of elongated wires to form filaments and grid members for radio tubes.

Welded materials, such as the above mentioned, ordinarily undergo rigid inspections and tests, but it is obvious that most defective welds cannot be detected by appearance, and it is only after a physical test is made by pulling the welds apart, that a defective weld is discovered. Where a series of welds are made on a substantially continuous article of work, such as the closure weld of the links of a continuous chain, the physical test is made on a small section, cut from the length, and if this section proves, in the pulling test, to have a defective weld, the entire length of chain is rejected. Substantially the same is true where a plurality of articles are welded to the continuous length. In all such cases, the failure of any one of the welds will result in the rejection of the entire length.

Most defective welds are caused by poor contact between the surfaces of the articles of work, which are to be welded together, or poor contact between the work and the electrodes. This poor contact generally results from the presence of dirt, oil or other foreign matter on the work. The elimination of this foreign matter is difficult and expensive, as such elimination must take place immediately before the parts are welded together, and even then some foreign matter, such as flakes from previous welds accumulates in the welding position and adheres to work to be welded.

I have found that generally, if the presence of foreign material or defective surfaces, is known before the welding operation is completed, the defect may be overcome by the application of the welding current for a greater interval of time than is usually consistent with a good weld, and I have utilized such discovery in developing the method and apparatus for detecting a defective weld during the welding operation, which forms the subject matter of this application.

This invention will become more apparent from the following description, referring to a preferred mechanism used in carrying out my method, and which is illustrated in the drawings. The essential novel features of the method and apparatus used in carrying out the method will be set forth in the claims.

Figure 5:
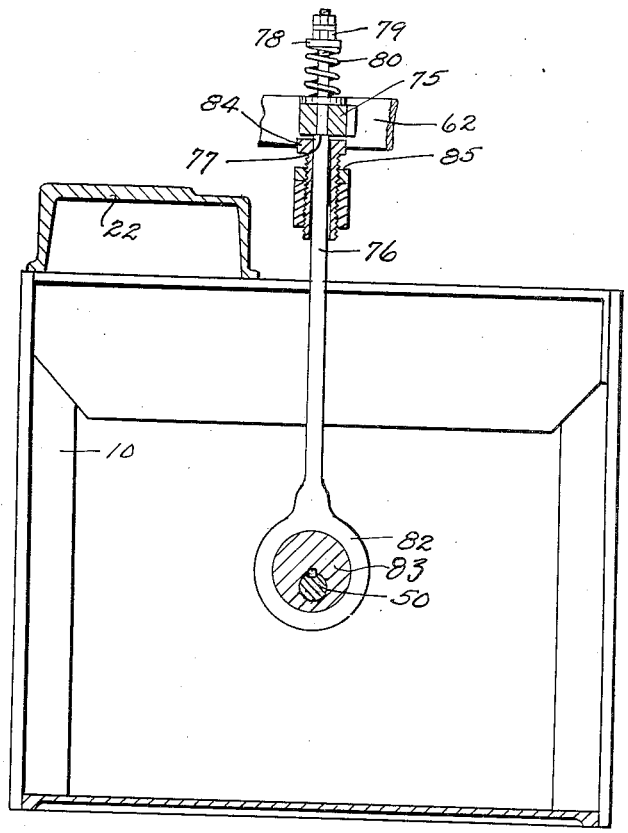
Figures 6, 7:
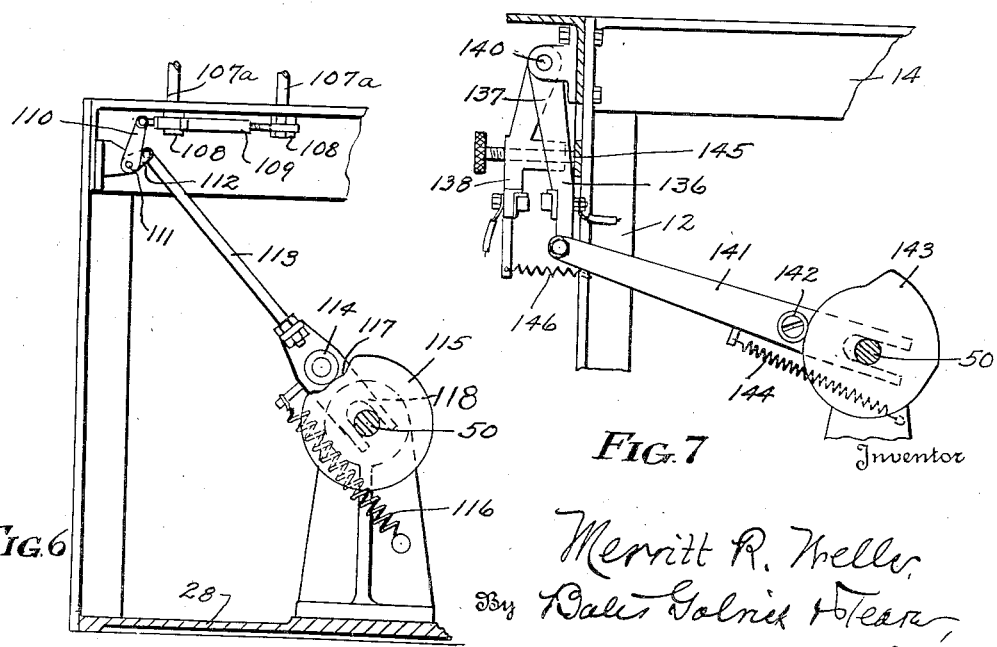
Figure 14:
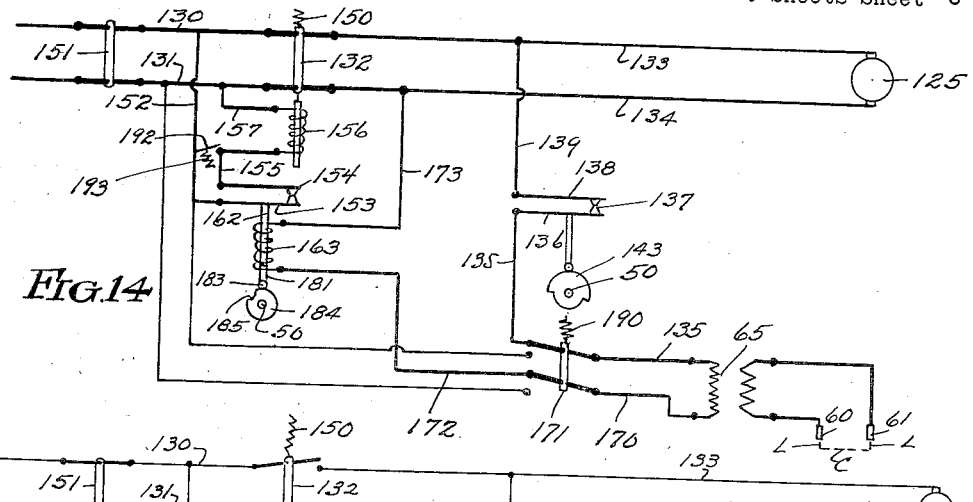
Figure 15:
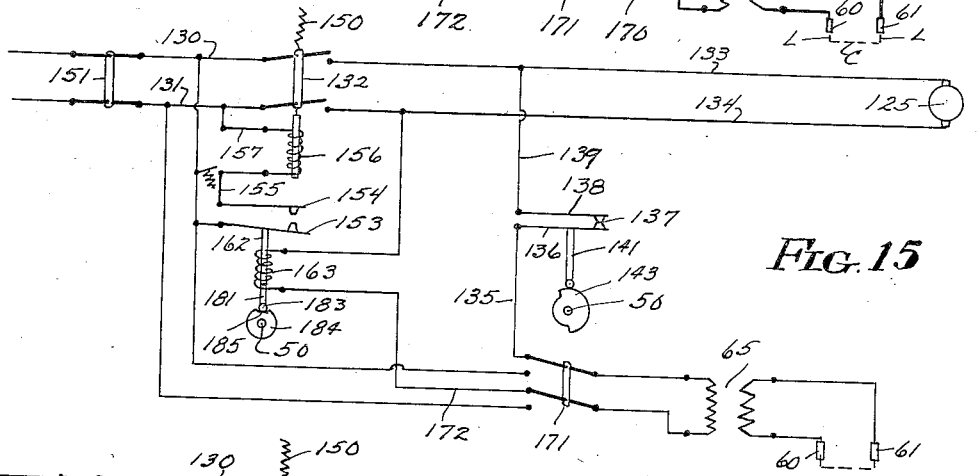
Figure 16:
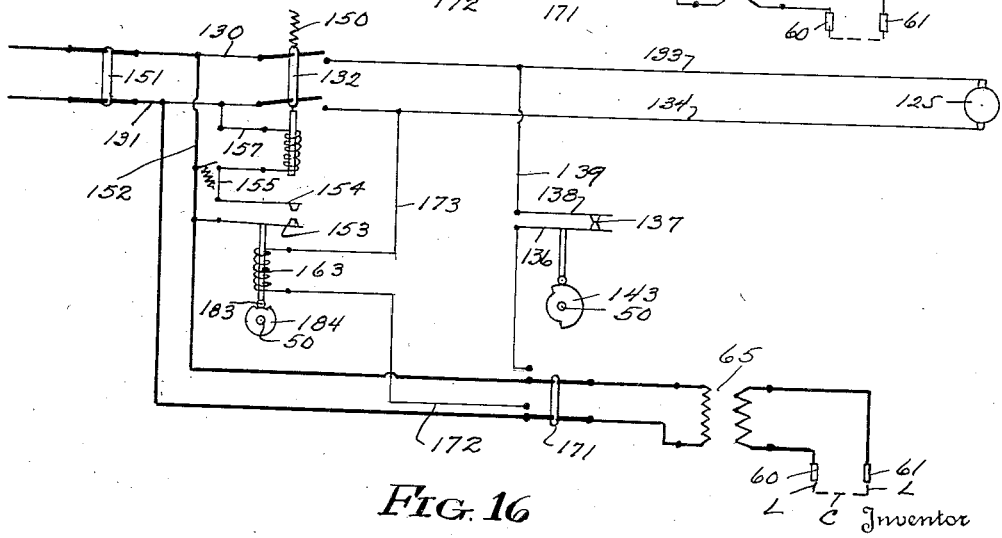

In the drawings, Fig. 1 is a side elevation of a welding mechanism equipped with an apparatus for carrying out my method. Fig. 2 is an enlarged fragmentary plan of the machine, partially broken away, illustrating the welding table in which the chain is held during the welding operation. Figs. 3 and 4 are sectional details, on the same scale as Fig. 1, illustrating different positions of the chain feed mechanism, the plane of the sections being indicated by the lines 3—3 on Fig. 2. Fig. 5 is a vertical section taken in the plane of the lines 5—5 on Fig. 2, and illustrates the electrode operating mechanism. Figs. 6 and 7 are sectional details illustrating the lug feed and switch operating mechanisms respectively. Fig. 8 is a sectional detail of the lug feed mechanism, as indicated by the lines 8—8 on Fig. 2. Fig. 9 is a sectional detail, as indicated by the lines 9—9 on Fig. 3. Fig. 10 illustrates one form of work for which the apparatus is designed. Fig. 11 is a view on an enlarged scale of one form of mechanism, which may be used to carry out my method. Fig. 12 is a view similar to Fig. 11, but illustrating certain of the parts in section, the plane of such section being indicated by the lines 12—12 on Fig. 2. Fig. 13 is a horizontal section through the main drive shaft, as indicated by the lines 13—13 on Fig. 3. Figs. 14, 15 and 16 are electric diagrams illustrating an electric circuit used to carry out my method.

In the drawings, I have shown an apparatus arranged to weld a pair of lugs onto the diagonally opposite corners of successive links in a substantially continuous length of chain. I will first describe the mechanical characteristics and operations of the machine shown, in order that the action of detecting the imperfect welds at certain periods in relation to the cycles of general operation may be better understood.

The apparatus shown comprises a main frame 10, arranged to support the different units of the welding mechanism, namely, a power shaft, a chain feed unit, a lug feed unit, a welding bed, an electrode assembly, a switch mechanism and my defective weld detecting mechanism. The frame 10 comprises a table-like structure supported by suitable legs 12, and provided with cross frame or bracing members 14, to add to the rigidity of the structure.

The chain "C", to which the lugs are to be welded, is supplied in substantially continuous lengths and may be stored in suitable containers, such as those shown at 15 in Fig. 1. The chain passes from a container 15 upwardly through a guide loop 16, carried by a bracket 17 adjacent one side of the frame, and passes over a pulley 18, journalled on a shaft 19, carried by such bracket. From the pulley 18 the chain passes across the machine to a welding bed 22, which is mounted on top of the machine adjacent the left hand side, as shown in Figs. 1, 2 and 3. This welding bed is provided with suitable guideways, and lug feeding means, hereinafter described. A flanged guide pulley 23, which is mounted in a bracket extending outwardly from the bed at the left-hand side of the machine, as shown in Fig. 1, is constantly driven and by reason of its frictional contact with the chain, acts to carry it to a position to drop into the container 15 arranged at the left-hand side of the machine. The arrangement is such that the chain will be held taut over the welding bed, which is raised slightly above the top of the machine.

In the welding mechanism illustrated, the chain is fed across the table from right to left, (Figs. 1, 2, 3 and 4), by a suitable feeding arm or lever 25, which feeds one link across the welding bed 22 every cycle of operation of the machine. The feeding arm 25 is pivoted on a cross-shaft 26, journalled in a bracket 27 carried by the base 28 of the machine. Adjacent the upper end of the lever or arm 25 is a channel shaped shoe 28, arranged to guide the chain on upper surfaces of the lever. The shoe 28 is interposed between the pulley 18 and the welding bed 22, and engages the chain at all times.

As shown in Figs. 1, 3 and 4, the chain is gripped for feeding by a pawl 29, which is pivotally mounted in a slot formed in the shoe 28 and is arranged to enter the links of the chain C. When the arm 25 is drawn to the rear, the pawl 29 is withdrawn from engagement with the chain by a suitable friction device. Such a device is shown in Figs. 3 and 9, and comprises a shoe 30, carried in a hollow stud 31, which is pivoted to a rearwardly extending arm 29a, of the pawl. The shoe is held in engagement with a rod 32, by a suitable compression spring 33, carried in the stud. The rod 32 is pivoted at 34 to a bracket 35, secured to a frame member 14, some distance to the right of the lever 25. The construction is such that as the lever 25 swings to the right, from the position shown in Fig. 3 to the position shown in Fig. 4, the pawl 29 is rocked counter-clockwise, thereby withdrawing the nose of the pawl from engagement with the chain. The pawl remains in this withdrawn position until the lever starts to swing in a reverse or forward direction, towards the left (to the position shown in Fig. 4). At the beginning of the left hand movement of the lever, the pawl is rocked clockwise, thereby causing the nose thereof to enter a link in the chain and carry it forward with the lever 25.

The lever 25 is swung by a cam 36, which is rigidly secured to the main drive shaft 50. A roller 37, which is carried by a lever 38, coacts with the cam 36 and has a resilient connection 39, with the lever 25. This resilient connection permits the forward stroke of the lever to be adjusted by a threaded stud 40, mounted on the right-hand side of the welding bed 22. The position of this stud 40 is such that the lever 25 will strike it on its forward or left-hand stroke and cause the chain to be carried to a predetermined position.

The arrangement of the mechanism above described is such that the chain is fed, a link at a time, to the welding table, one link being fed every cycle of operation of the machine.

In the embodiment illustrated, the feeding arm 25 is positively driven in a feeding direction by the cam 35, but is returned by a spring 41, one end of which is secured to the arm 25 and the other to a suitable frame member. The spring also causes the roller 37 to be normally maintained in contact with the cam 36. However, on the right-hand movement (in Figs. 1 and 3) of the lever 25, it is limited by an adjustable stop 42, carried by a frame member. Such stop, together with the stop 40, insures accurate feeding and positioning of the links, as well as permits the feed to be adjusted for various sized links.

The welding table comprises a bed 22, (Figs. 1, 2 and 3) on which is mounted a guide block 51, through which is cut a channel 52, arranged to serve as a guide for the chain, and through which channel the lever 25 feeds the chain. After the lever 25 has positioned a link, lugs indicated at L in the drawings are fed by suitable means, hereinafter described, which superimposes the lugs upon opposite or diagonal corners of the links, as illustrated in Fig. 2. Electrodes of respectively opposite polarity are then brought into contact with the lugs and a welding current applied, thereby simultaneously welding both lugs to the link. The link itself carries the current from one weld to the other.

In the present embodiment, as shown in Figs. 1 and 8, there are two electrodes 60 and 61, mounted in an electrode carrier 62, and separated from each other and the carrier by suitable insulation (not shown). The electric current is carried to the electrode carriers by flexible laminated straps 63, which are connected to the opposite poles of the secondary winding of a transformer unit 65, the primary winding of which is connected to a suitable source of current supply, as will be hereinafter more fully described.

In the embodiment shown, the lugs L are short cylindrical pieces and are positioned on diagonally opposite corners of the links at an angle of substantially 27 degrees to the axis of the chain. Hence, it has been found advantageous to mount the electrode carrier 62 at an angle of 27 degrees from the path of movement of the chain. The electrodes 60 and 61 are mounted in the forward or left-hand end of the carrier, the rearmost end of which is pivotally mounted on a pin 71, carried in an upstanding bracket member 72, secured to the frame in any suitable manner. The carrier 62 is reciprocated or swung vertically in a manner which will raise the electrodes clear of the lugs and thereafter bring them down into contact with the lugs and increase the pressure of the lugs as the welding current softens the work, thereby insuring a most effective welding of the lugs to the link.

The electrode carrier is rocked by a cam secured to the main drive shaft 50. Pivotally mounted in a slot 73, intermediate the ends of the carrier 62, is a block 75, through which a bar or rod 76 passes. The bar 76 has a shoulder 77, which normally abuts the lower or bottom face of the block 75. The uppermost end of the rod 76 extends above the block and is provided at its upper end with a washer 78 and an adjusting nut 79, while disposed between the washer and the block is a suitable compression spring 80, which surrounds the rod and normally serves to retain the shoulder 77 of the rod 76 in position against the bottom surface of the block 75.

When the welding electrodes are moved upward, the shoulder 77 is forced against the block 75 and positively swings the carrier 62 upward, raising the electrodes a short distance above the chain, in which position the chain may be advanced without interfering with the electrodes. When, however, the rod 76 is pulled downward to bring the electrodes into contact with the lugs L, the carrier 62 is moved downward until the electrodes abut the work, and then, as the heating current is applied to the electrodes, further downward movement of the rod 76 causes the compression of the spring 80, thereby increasing the pressure on the electrodes and forming the welds under compression.

The electrodes are operated from the main drive shaft 50. As shown in Fig. 5, the rod 76 is connected to an ear on the ring 82, which embraces an eccentric cam 83, rigidly secured to the drive shaft 50. The downward movement of the electrodes is limited by a suitable stop 84, carried in a frame member 85, and through which the rod 76 passes. This prevents excess pressure of the electrodes on the lugs and eliminates undue distortion of the links. The stop 84 is adjusted so that it contacts with the lower surface of the block 75 when the electrodes have reached the lowermost position consistent with a good weld combined with the minimum amount of distortion of parts. Thereafter the continued downward movement of the rod serves only to compress the spring 80, and has no further effect on the carrier 62 or the parts being welded.

The lugs L are fed to the welding table 22 from a pair of tubes 90, Figs. 1 and 2. As shown, the lugs are supplied to the tubes 90 from a feed hopper 91, and are conveyed by the tubes to a pair of channels 92 in the welding table 22. The channels 92 are disposed on opposite sides of the chain and are offset relative to each other so that the lugs may align with the diagonal corners of the links, as shown in Fig. 2.

Slidably mounted in each channel 92 is a channel-shaped bar 93, each of which carries a flat plunger bar 94, and is covered by a suitable cover plate 95. Suitable plates 96 secured to the top of the table 22 act to retain the channel bars and plungers within their respective grooves 92. The plungers and channel bars are reciprocated by a suitable mechanism, hereafter described.

When the chain is being fed across the table 22, the plungers are drawn away from the chain, and one end of a recess 97 in each of the plungers engages a pin 98 mounted in the corresponding channel bar and retains the bar in a withdrawn position. When the chain comes to rest, the plungers 94 are brought toward the links, and springs 99 act on pins 101, which are integral with the channel bars, and urge the channel bars against the links, thereby gripping the link in the welding channel 52 of the bed.

The lugs L are fed from the tube 90 through slotted openings in the sides of the channel bars 93. As the lugs are fed into the channel bars they underlie flat springs 105, carried by the cap 95, and which serve to keep the lugs in contact with the channel bars and retard their movement, thereby preventing inadvertent displacement due to the speed of the mechanism. In this position the bottom face of each lug is in a plane slightly above the top of the link, and as the plunger bars 94 are moved toward the link, each plunger forces a lug from beneath its respective spring onto the link, where the lugs are immediately gripped by the electrodes 60 and 61. When the lugs have been positioned on the link and have been gripped by the electrodes, the plungers 94 are withdrawn and the welding operation takes place. Thereafter two more lugs are fed to the channel bars and the chain is advanced, bringing another link into welding position, and the cycle of operation begins anew.

The lug feed, namely the plungers 94 and their associated parts, is operated from the main driving shaft 50. Each plunger 94 has, as shown in Fig. 2, a hook portion 106, which projects from the outer ends of respective channels 93. Each hook 106 embraces the rounded ends of respective arms 107, which are rigidly secured to vertically extending shafts 107a, (Figs. 2 and 6). The shafts 107a extend vertically through the welding bed 22 and have, rigidly secured to their lowermost ends, suitably horizontally extending arms 108, which are connected by links 109 to levers 110, which are rigidly secured to a rock shaft 111.

The rock shaft 111 is operated by a cam mechanism which is associated with the main drive shaft 50. Rigidly secured to the rock shaft 111 is a lever 112, which is pivotally connected to an end of a bar 113, the other end of which is forked as at 118 (Fig. 6), and embraces the main shaft 50. The bar carries a roller 114, which is drawn into contact with a cam 115, rigidly carried by the main shaft 50, by a suitable spring 116. As the shaft 50 rotates, the cam roller 114 is drawn into a recess 117 in the periphery of the cam once in each cycle of operation of the machine thereby causing the lugs to be fed by the plungers 94 to the chain link.

The main driving shaft 50 which operates the various mechanisms is supplied with power from a motor 125. The motor is mounted on a frame member 14 and is drivingly connected by a belt 126 with a speed reduction unit 127, the power output shaft of the speed reduction unit being a continuation of the main drive shaft 50. Electrical energy is supplied to the motor from suitable source through lines 130 and 131 which lead to a switch 132 arranged to close and open the circuit to the motor supply lines 133 and 134. Hence, when the switch is closed the motor will drive the shaft 50 setting in motion the various mechanisms heretofore described.

To conserve electrical energy, as well as to prevent arcing between the electrodes and the work, the welding current is supplied to the transformer 65 only during the actual welding operation, that is while the electrodes are in contact with the work. To this end, as shown in Figs. 14 to 16, one side of the input line leading to the primary winding of the transformer 65 is connected by a line 135 to a movable contact arm 136, of a suitable switch 137. The other contact 138 of the switch is connected by a line 139 to the motor supply line 133, which is connected to the source of current supply by the switch 132 and the line 130, heretofore described. The other side of this primary winding is connected to the motor supply line 134, as will be hereinafter more fully described.

The switch 137 may be of any suitable type. As shown in Fig. 7, the movable member 136 of the switch comprises a link pivoted to the frame at 140, and connected to a forked lever 141, the forked end of which embraces the shaft 50. The lever 141 is provided with a roller 142 which is retained in contact with a cam 143 by a suitable spring 144. The cam 143 is secured to the main drive shaft 50 and hence operates the switch in synchronism with the other mechanisms of the welding machine. The arrangement of the linkage and cam 143 is such that immediately after the electrodes 60 and 61 reach the work, the contact of the switch is made and an electric circuit established to the transformer 65. The switch member 138 is preferably retained against an abutment 145 by a spring 146, so that the continued movement to the lever 141, after the contact is made, will retain the switch in its active position without damage to the parts thereof.

The mechanism so far described is substantially that illustrated, described and claimed in my patents heretofore mentioned, and is one type of welding mechanism to which my method of detecting imperfect welds is especially applicable. The method used contemplates the interruption of the current supply lines for the driving motor to stop the action of the various mechanisms at a time when the electrodes are in contact with the defective weld, and the application of electrical energy to the transformer and electrodes, while the driving motor is idle, and for a variable length of time under direct control of the operator of the machine.

I have found that in resistance welding, such as carried out by the apparatus heretofore described, that there is a variation in the quantity of current flowing at the primary of the transformer during the actual welding operation. I have also found that there is a difference in the current flowing in the instance of a good weld and that of a defective weld. These irregularities, of course, change with sizes of work and kinds of metal. However, notwithstanding such changes as are introduced by different character of work, a material difference in the flow of current for good welds and defective welds still exists.

My experiments show that when the welding current is applied, the ampere reading rises abruptly and then as the weld progresses and the metal becomes molten at the point of contact, the reading gradually decreases and when the weld is completed, the reading is still a material amount above its zero starting point. When a defective weld occurs, the reading rises abruptly on the application of the welding current, and then gradually tapers off, as with a good weld. However, in a defective weld the readings are below the readings for a good weld.

My method of detecting for a defective weld contemplates measuring the amperage at the primary winding of the transformer after a time interval, normally required for a good weld to reach its maximum ampere reading. If the amperage at this point is below the normal reading for a good weld, it is known that the weld is defective and the mechanism should be stopped.

I have previously stated that after the reading for a defective weld reaches the maximum, it drops gradually. This is true with reference to a time interval equivalent to the time required to produce a good weld with substantially clean surfaces and with average contact conditions. However, in the defective weld the drop may be very small and sometimes negligible for this length of time. I have found, in case of a defective weld, that if the length of time for the application of the welding current is increased over that required for a good weld under normal conditions, this weld, when removed from the machine and tested physically, proves to be a good weld.

Briefly, my method comprises measuring certain of the current conditions prevailing in the welding mechanism after the welding current has been applied and before it has been cut off, and if these conditions are under a predetermined standard, interrupting the normal operation of the welding mechanism and then exposing the work to the welding current for an additional length of time, and thereafter causing the welding operations to continue in their usual time cycles.

In the drawings, I have shown in Figs. 1, 2, 3, 11 and 12, a novel arrangement for detecting the defective welds, while in Figs. 14, 15 and 16 I have diagrammatically illustrated electrical control circuits to carry out my method by such apparatus. Such apparatus includes the switch 132, heretofore mentioned, which in the normal operation of the mechanism is retained closed, as will hereinafter be described. I have arranged the control for this switch so that it will be opened at a predetermined time during the welding operation, if the amperage flowing through the primary of the transformer is below a predetermined limit. The opening of the switch 132 then stops the entire welding mechanism with the electrodes in contact with the work. I also provide a switch mechanism to furnish the electrodes and transformer with energy from the source, and another switch for resetting the switch 132 when the weld is completed, to again start the mechanism in its normal cycle of operations.

As shown in Fig. 16, the switch 132 is normally held open by a spring 150. This switch is closed when the machine is first set in operation, and is maintained closed until the machine is shut down by the operator or until a defective weld is reached. The machine is started by the closing of a master switch 151, which is interposed between both sides of the source and the control switch 132. When the master switch is closed, the current flows from the source through lines 130, 152 to a normally closed movable switch point 153, its associated contact 154, a line 155, to a solenoid 156 and thence through lines 157 and 131, and the master switch 151 to the source. The solenoid 156 is connected to the control switch 132 in such a manner that, when the solenoid is energized the control switch will be closed. This supplies current to the motor and electrode transformer control switch 137, and such condition will exist until either the master switch 151 is opened by the operator or the switch 153, 154 is opened, as will hereinafter be described.

The switch 153, 154 is arranged to be responsive to the flow of current in the primary circuit of the transformer 65. To this end, the switch members 154 and 153 are mounted on an insulating block 160 carried by a frame bracket 161 of the machine. The switch member 153 preferably comprises a flat spring arranged to normally carry its contact point out of engagement with the adjustable switch member 154. A plunger 162 of a solenoid coil 163, which is mounted on the bracket 161, is arranged to raise the switch member 153 into contact with the switch member 154, when the solenoid is energized. The plunger 162 is shown in Fig. 12 as carrying an insulating cap 164 resting on a compression spring 165, and bearing against the contact spring 153.

The solenoid 163 is connected in series with the primary winding of the transformer 65. As shown in Fig. 14, one end of the transformer primary winding is connected as heretofore described to the line 135, the switch 137 and the line 139, to the motor supply line 133, which is energized as long as the control switch and the master switch are closed. The other side of the primary winding of the transformer is connected by line 170, switch 171 and line 172, with one end of the solenoid coil 163. The other end of the solenoid coil winding 163 is connected by a line 173 to the motor supply line 134, thereby completing the welding circuit. The solenoid 163 is of such a character that it will retain the switch 153, 154 closed, only when a predetermined current flows through the primary winding of the transformer and the solenoid coil winding, above that which would result in the case of a defective weld.

The switch 153, 154 is also controlled by, and responsive to, the time cycle of operation of the machine, so that the testing for the current condition in the primary winding of the transformer will be effective only at a predetermined time period of the mechanism, namely, after the weld has commenced and the maximum flow of current for a normal weld has been reached.

As shown in Figs. 11 and 12, the lowermost end 180 of the solenoid plunger 162 is arranged in axial alignment with a second plunger 181 mounted in vertical ways 182 in the frame bracket 161. The lowermost end of the plunger 181 is provided with a roller 183, arranged to coact with the surface of a cam 184, which is rigidly mounted on the main drive shaft 50. Normally, the cam 184 raises the plunger 181 into contact with the solenoid plunger 180, causing the uppermost nose thereof to close the switch member 153, 154, thereby rendering effective the operation of the solenoid coil 163. As has been previously explained, the operation of the welding machine, including all of its mechanisms, is controlled directly from a series of cams rigidly secured to the main driving shaft 50. As the cam 184 is likewise secured to this same shaft, it is readily apparent that the plunger 181, 162 will be operated in synchronism with the welding unit and the welding switch 137.

The solenoid and switch mechanism just described may be adjusted for varying conditions of installation in several ways. Thus, one may change the position of the contact carrying block 160 as allowed by the slots therein (Fig. 12) through which it is secured to the supporting bracket; the screw carrying the contact 154 may be turned to change the presentation of that contact to the spring 153; the relation of the plungers 180 and 162 may be changed by means of their threaded connection 166, and finally the air gap in the solenoid may be adjusted by turning in or out the metallic sleeve 167 in which the core 163 is slidably mounted. To enable the latter adjustment, the sleeve is threaded in the fixed portion of the solenoid and has spanner notches 168 at the upper end.

The arrangement of the cam 184 is such that the roller 183 will enter the notch 185 of the cam shortly after the welding current has been applied to the electrodes, and a sufficient time has intervened between said application of the current for the maximum flow of current of a normal weld to have been completed. At this time the plunger 181 drops, and if the flow of current through the solenoid 163 and primary winding of the transformer 65 is equal to or above the normal, for making a good weld, the plunger 162 will remain in its uppermost position under the influence of the winding of the solenoid coil 163, thereby retaining the switch 153, 154 in closed position and maintaining the current on the solenoid 156 to retain the motor control switch 132 in a closed position. However, if at this time the current flowing through the primary winding of the transformer 65 and the winding of the solenoid 163 is below normal, and is below that point which determines whether or not the weld is defective, the solenoid plunger 162 will fall under the action of gravity, plus that of the springs tending to lower the plunger, permitting the switch member 153 to bring its contact away from the switch member 154, thereby opening the circuit to the solenoid 156 and permitting the spring 150 to open the motor control switch 132. This immediately stops the action of the entire welding mechanism, leaving open the lines leading to the motor 125 and the transformer.

It is now evident to the operator of the machine that the weld is defective. The operator therefore may examine the weld, and if the conditions are abnormal, the switch member 171 heretofore mentioned may be manually thrown, placing the primary winding of the transformer 65 in direct circuit with the lines 130 and 131, which derive their source of current through the master switch and are not affected by the movement of the motor control switch 132. This, then, applies the welding current solely upon the transformer and the electrodes, without affecting other mechanisms of the machine. The operator may retain such switch in its closed position for an interval of time sufficient to overcome the defective contact of the weld and produce a good weld. At the expiration of this time, the operator will release the switch 171, permitting it to return under the influence of a spring 190 to its normal position, again throwing the transformer in series with the switch 137, the solenoid 163, and into the motor circuit which is controlled by the switch 132. The operator then momentarily depresses a switch 192 which cuts out the switch 153, 154, completing the circuit to the solenoid 156, causing it to close the switch 132 and then applying current to the motor circuit. This switch may be released as soon as the notch 185 has passed the roller 183, and thereafter the high surface 195 of the cam 184 will retain the switch 153, 154 in its closed position, causing the machine to go through its normal operation.

I will now summarize the timing of the various operations and steps of my method, with relation to the mechanism shown in the drawings, reference being had to the views showing the respective parts and also to the wiring diagrams of Figs. 14, 15, and 16, in which the heavy lines indicate active circuits, and the light lines indicate inactive circuits.

We will assume that the parts are in the following positions: The feed lever 25 is in its rearmost position (Fig. 4), and is ready to start the feed to engage the chain for a new purchase thereon. The lug feeding mechanism is idle. The transformer control switch 137 is in an "off" position. The electrodes 60 and 61 are being raised free from the links which have previously been welded. The operation from this position is as follows:

The switch contacts 138, 137 are separated, thereby cutting the current from the electrodes 60 and 61. The electrodes are then carried upwards to clear the lugs. While the electrode carrier 62 moves to its uppermost position and starts downward, the chain feeding arm 25 functions to engage and feed the chain a distance of one link. The lug feed next comes into operation to initiate the feeding movement of the lugs from the channels to their relative positions on a link of the chain. While the lugs are being fed, the chain feed stops, and the channel members 93 also snap into position to grip the link. The lug feed continues in its movement until the lugs are placed on the previously positioned link of the chain. The electrodes are then brought into contact with the lugs, and the lug feeding mechanism withdraws to clear the electrodes. While the lug feeding mechanism withdraws, and after the electrodes have contacted with the lugs, the switch 137 is closed. The electrode carrier operating-rod 76 continues its downward movement, and pressure is applied through the spring 80 to the lugs, thereby welding the lugs to the links under pressure. The chain feed lever 25, during this time, has started on its return movement to pick up another link.

Shortly after the switch 137 is closed the low point of the cam 184 (Fig. 11) coacts with the roller 183, placing the switch 153, 154 under the control of the testing solenoid 163. If, at this time, the current flowing through the coil 163 is normal or above normal, the switch 153, 154 will remain closed and the various mechanisms will complete their operations and return to the starting position. The cycle of operation will then begin anew.

When a weld, which under normal operations would be defective, is in progress, the solenoid 163 will not receive sufficient energy to retain the switch 153, 154 closed, and when the roller 183 falls into the cam groove 185, the plunger 162 will drop, causing the switch 153, 154 to be opened, thereby opening the motor control switch 132 and stopping the motor and the various mechanism. The operator momentarily changes the position of the switch 171 to apply the current to the transformer and electrodes for an abnormal length of time. The switch 171 is then released and the switch 192 depressed to initiate the rotation of the motor and cause the various mechanisms to continue their normal operations. This interrupted cycle of operation is then completed, as heretofore described, and the next feeding movement of the chain begins another cycle.

It will be observed that my method of detecting a defective weld, before the weld is completed, permits the operator to correct the conditions or apply the welding current an abnormal length of time to cause it to correct the conditions. Accordingly, by reason of this detection which permits correction to enable the weld to be made properly, I decrease the amount of rejected material to a point where the loss from defective welds is substantially eliminated. Also, by my method, I have enabled the production of an electric welded chain or other article of higher quality than has been possible with the methods and apparatus used in the past.

I claim:

1. In an apparatus for welding in a series of repeating cycles, the combination with means for successively positioning work to be welded, means for supplying current to the positioned work, means for measuring the current during its welding application, and means operating automatically consequent upon such measurement being out of the range with a predetermined standard for interrupting the cycles of operation.

2. In an electric welding machine, a welding electrode mounted for movement to and from the work, an electric circuit connecting said electrode with a source of electrical energy, a work-feeding means, means operating to cause the electrode and the feeding means to function in a timed relationship with each other once in each of a series of successive cycles of operation, each cycle having the same predetermined timed interval, and means responsive to said cycles of operation and also responsive to the flow of current in the welding circuit to interrupt the timed intervals of certain cycles of operation.

3. In an electric welding machine arranged to weld metallic parts together in a series of normally non-interrupted time cycles of operation, a welding electrode, and an electric switch responsive to the time cycle of operation of the mechanism and responsive to the flow of current in the welding circuit to control the flow of current to the electrode.

4. In a welding machine, means for feeding in successive cycles the parts to be welded, a welding electrode, an electric switch responsive to the time cycle of operation of the mechanism and also responsive to the flow of current in the welding circuit, to control the flow of current to the electrode.

5. In an apparatus for welding in a series of repeating cycles, the combination of an electric motor and mechanism driven thereby for successively positioning work to be welded, means for supplying current to the positioned work, means for measuring the current during its welding application, and means operating automatically consequent upon such measurement being out of the range with a predetermined standard for stopping the motor.

6. In a welding apparatus, the combination of a welding electrode, an electric circuit adapted to connect said electrode with a source of electric energy, means for feeding the work to be welded, a cam operated by said means, a switch in the electric circuit, and means for jointly controlling said switch by said cam and according to the amount of current flowing.

7. In a machine for welding lugs on the links of a chain, the combination of means for periodically progressing a continuous chain, means for positioning lugs on successive links of the chain, an electrode adapted to engage the successive lugs, connections for supplying current to said electrode, a solenoid in said connections, a motor for driving the mechanism, a switch in the motor circuit controlled by said solenoid, and a cam operated by the motor-driven mechanism for determining the time interval when the solenoid may operate the switch.

8. An apparatus for controlling electric welding in repeating cycles, comprising means for supplying current to the work, means for measuring the flow of such current during the welding application, and means operated under the control of the aforesaid means for interrupting the cycle of operation consequent upon the current measurement being out of range with a predetermined standard.

9. An apparatus for welding by a series of automatically successive cycles of predetermined time duration, comprising means operating in each cycle for positioning the work to be welded, means for applying current thereto, means operating during the flow of such current for measuring the same, and means operated under the control of the aforesaid means for controlling the continuity of the cycles by such measurement.

10. An apparatus for controlling welding in repeating cycles, comprising means for positioning the work to be welded, means for supplying current to the positioned work in each cycle of operation, means for measuring the flow of such current during the welding application, and means for automatically interrupting the cycle of operation consequent upon the current measurement being out of range with a predetermined standard.

11. In a welding apparatus, means for positioning metallic parts together, a source of electrical energy, a welding electrode, a connection between the source and the electrode, a solenoid in said connection, and a switch in said connection operable under the control of said solenoid and movable to open position when the flow of current is below a predetermined amount.

12. An apparatus for electric welding, comprising means for positioning the work to be welded, means for automatically applying current thereto and thereafter shutting it off, means for measuring certain conditions of the current prevailing in the welding mechanism after the welding current has been applied and before the welding current has been shut off from the weld, and means operating under the control of said measuring means and depending upon such conditions being outside of a predetermined range for thereafter exposing the work to the welding current.

MERRITT R. WELLS.